United States Patent [19]

Barge

[11] Patent Number: 4,459,087
[45] Date of Patent: Jul. 10, 1984

[54] FAN UNIT FOR AN INTERNAL COMBUSTION ENGINE OF AUTOMOBILE VEHICLE

[75] Inventor: Jean Barge, Montbeliard, France

[73] Assignee: Aciers et Outillage Peugeot, Audincourt, France

[21] Appl. No.: 384,296

[22] Filed: Jun. 2, 1982

[51] Int. Cl.³ .................. F04B 35/04; F01P 7/02; H02K 37/00
[52] U.S. Cl. ...................... 417/356; 417/423 R; 123/41.12; 123/41.49; 310/63; 310/49 R; 318/254; 416/169 A; 416/189
[58] Field of Search ............... 417/355, 356, 423 R, 417/32; 310/63, 49 R; 123/41.49, 41.12; 318/254, 254 A; 416/169 A, 189 R

[56] References Cited

U.S. PATENT DOCUMENTS

| | | | |
|---|---|---|---|
| 1,996,195 | 4/1935 | Ferguson | 417/356 |
| 2,697,986 | 12/1954 | Meagher, Jr. | 417/356 |
| 3,394,682 | 7/1968 | Bensinger | 123/41.12 |
| 4,025,831 | 5/1977 | Webb | 318/254 |
| 4,060,753 | 11/1977 | Okuyama et al. | 318/254 |
| 4,065,706 | 12/1977 | Gosling et al. | 318/254 |
| 4,228,384 | 10/1980 | Arnold, Jr. et al. | 318/138 |
| 4,257,554 | 3/1981 | Willingham | 123/41.12 |
| 4,358,245 | 11/1982 | Gray | 123/41.49 |
| 4,360,751 | 11/1982 | Arnold, Jr. et al. | 310/63 |
| 4,396,875 | 8/1983 | Yamauchi | 318/254 |
| 4,413,947 | 11/1983 | Seki | 123/41.49 X |

OTHER PUBLICATIONS

*Joy Manufacturing Company Bulletin J-614*, p. 5, Published May 1956.

Primary Examiner—William L. Freeh
Assistant Examiner—Paul F. Neils
Attorney, Agent, or Firm—Sughrue, Mion, Zinn, Macpeak and Seas

[57] ABSTRACT

A fan unit for cooling an internal combustion engine comprising a fan impeller associated with a coaxial channel for guiding the air travelling through said impeller and an electric driving motor of DC type. The channel is fixed to the ends of the blades of the impeller and rotates with the impeller and itself constitutes the rotor of the electric motor whose stator coaxially surrounds at least a part of the channel. The stator is rigid with a fixed shaft around which the impeller rotates. This fan unit has a high permeability when inoperative so that it is particularly adapted for use in an automobile vehicle.

12 Claims, 8 Drawing Figures

FAN UNIT FOR AN INTERNAL COMBUSTION ENGINE OF AUTOMOBILE VEHICLE

DESCRIPTION

The present invention relates to a fan unit for cooling the internal combustion engine of an automobile vehicle comprising a fan impeller and an electric driving device which comprises an annular stator including field coils and a rotor having a hub and an outer annular body of a ferromagnetic material adapted to cooperate electrically with the coils of the stator and connected to rotate with the hub through the blades of said impeller.

According to U.S. Pat. No. 1,966,195, a fan unit is known which is of utility as a household fan and has the general features defined hereinbefore.

In this case, the stator coils are adapted to be provided with alternating current and the rotor has induction bars, the whole thus constituting an electric motor of the asynchronous type.

From the mechanical point of view, the annular rotor comprises an assembly of sheets, one of the end sheets of which is cut out and deformed from a solid circular sheet in such manner that the latter forms, after the cutting and forming operations, not only an element of the assembly of sheets but also the fan impeller. Further, the electric motor arranged in this way is placed in a case which is also of sheet metal and apertured on each side of the motor.

This prior fan unit is particularly unsuitable for use in a device for cooling an engine of an automobile vehicle. Indeed, in this particular application, the fan unit may be driven by this internal combustion engine and it absorbs at full speed an appreciable amount of energy. Thus, the power consumed may be up to 500 to 600 Watts for a number of revolutions of the impeller which might be as much as 2 500 rpm. Consequently, it is extremely important, above all in times of shortage, to impart to the fan unit maximum efficiency. This is clearly not the case of the fan of the U.S. Pat. No. 1,996,195 in which the shape of the blades and of the outer case result in disturbances of the flow of air produced and in particular in turbulences which are such that the efficiency can only be poor.

Furthermore, it is known that the impeller of a fan of an automobile vehicle engine operates in accordance with a speed which is governed by the temperature and for certain speeds of the engine or certain speeds of the vehicle, it is unnecessary that the impeller rotate in order to reach the desired temperature. It will be understood that the intention is to increase as far as possible the periods of rest of the fan, which can only be obtained if during these periods of rest the fan opposes a resistance which is as small as possible to the flow of air toward the radiator of the internal combustion engine (or this engine itself if it is cooled by air). In other words, it is essential that the "permeability" of the fan must be as large as possible, this expression in fact designating the percentage of the front area of the fan which is not occupied by the blades, the hub and the outer ring (rotor) to which the ends of the blades are fixed.

The permeability of the fan of the aforementioned U.S. patent is quite clearly very poor also, since the blades are obtained by deformation of a radial plane of the impeller and the case closes a large part of the front area, in particular at the periphery.

Further, the electric motor in the aforementioned patent is an AC motor and it does not lend itself to use in an automobile vehicle whose electric system is always a DC system.

The invention has therefore for object to provide a fan unit of the general type referred to hereinbefore but adapted to be employed, with high efficiency and permeability, for cooling an internal combustion engine of an automobile vehicle.

The invention therefore provides such a unit wherein the outer annular body of the rotor is formed by an air flow guiding tubular channel, said channel extending axially and comprising at the outer periphery thereof permanent magnets which cooperate with said stator, said electric motor being of the DC autosynchronous type supplied with current by an electric circuit which generates periodic signals and the impeller formed by said blades is of the laminar type whose profile only produces the detachment of the streams of the air flow driving it at the trailing edge of said blades.

As a result of these features, the driving motor of the fan unit is perfectly integrated in the construction of the guide channel and its support device, which permits limiting the axial overall size of the unit to that of the channel and obtaining maximum permeability, the whole diameter of the channel being by construction utilized for the circulation of the air since the ends of the blades are fixed to the inner peripheral surface of the channel. Moreover, the aerodynamic efficiency of this unit is very advantageous owing to the particular profile of the blades. Furthermore, as the motor is a DC motor and partly integrated in the channel, the unit is perfectly adapted for incorporation in an automobile vehicle.

The invention will be described hereinafter in more detail with reference to the drawings which show only several embodiments and in which.

Figures 1, 2:
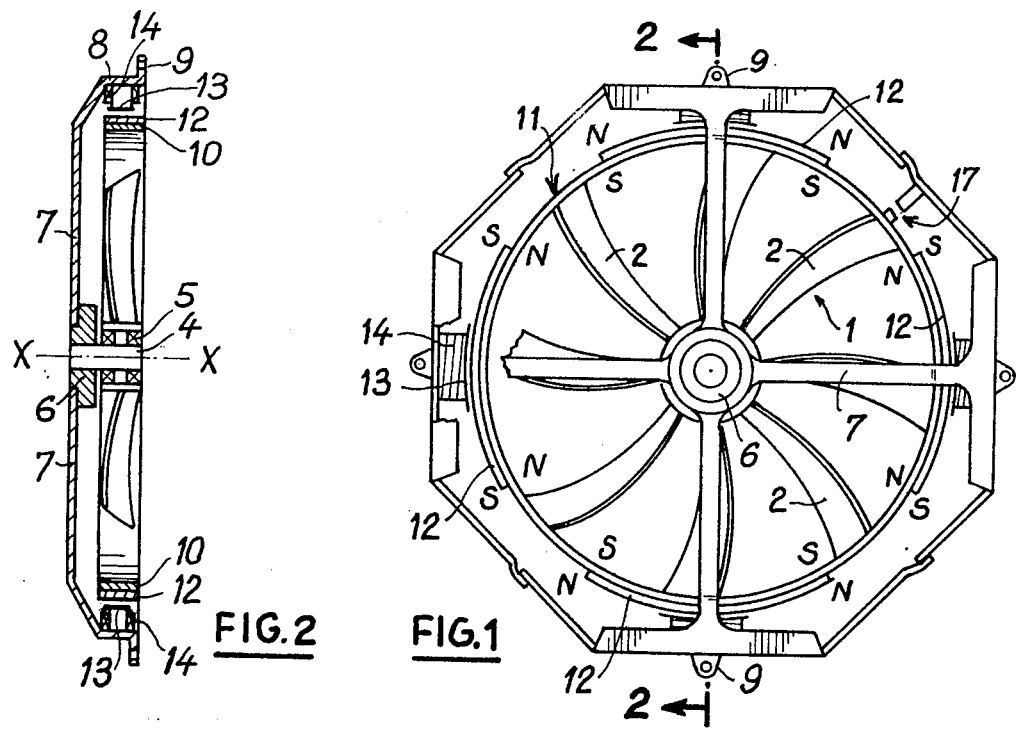
FIG. 1 is a front elevational view of a fan unit according to a first embodiment of the invention.
FIG. 2 is a sectional view taken on line 2—2 of FIG. 1.
Figure 3:
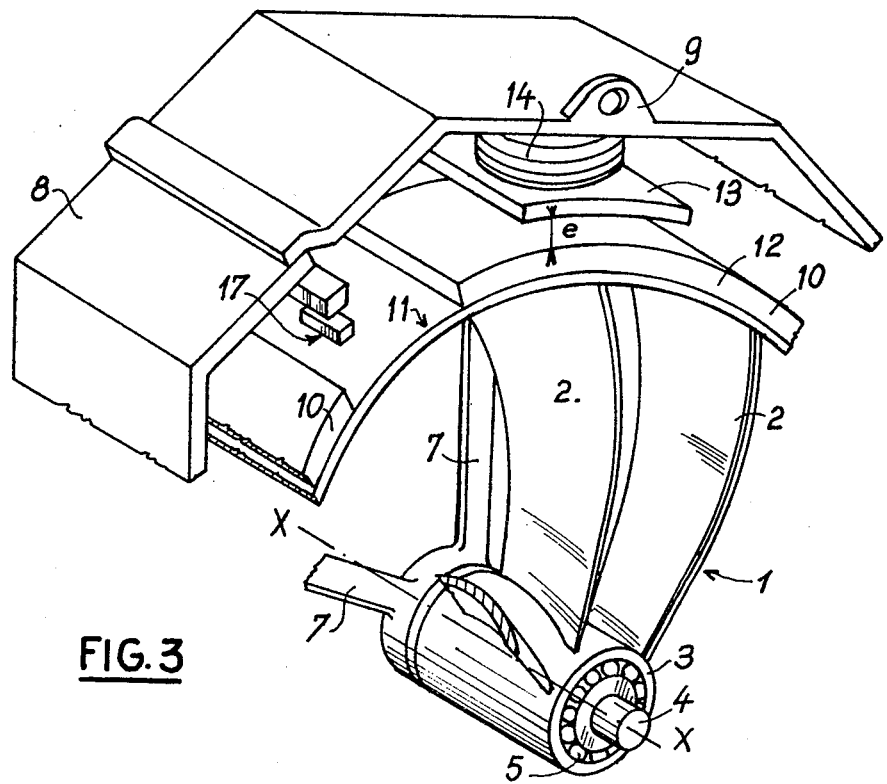
FIG. 3 is a partial perspective view of the fan unit of FIGS. 1 and 2 seen from the opposite side with respect to that seen in FIG. 1.

FIGS. 1 to 3 show a first embodiment of the invention in which the fan unit comprises an impeller 1 having for example four blades 2 which are fixed to a hub 3 rotatively mounted on a fixed shaft 4 havng an axis X—X. Bearings 5 are provided between the hub 3 and the shaft 4. These bearings may be of the self-lubricating type or rolling bearings.

Figure 5:
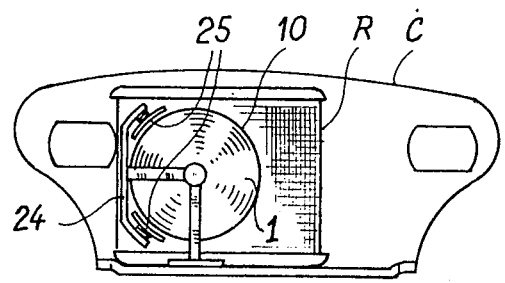
FIG. 5 is a diagrammatic view of another embodiment of the invention, showing the placement of the fan unit in the engine compartment of an automobile vehicle.

The shaft 4 is rigid with a fixing ring 6 to which are fixed support arms 7 extending radially outwardly. In the illustrated embodiment, these arms are four in number, but this number may be larger or smaller, for example two (FIG. 5).

The arms 7 are bent at their outer ends so as to be fixed to a sleeve having the same axis X—X as the shaft 4. This sleeve has fixing lugs 9. It is by means of these lugs that the fan unit may be rendered rigid with the body of an automobile vehicle.

The hub 3 has a diameter which is just sufficient to be compatible with the outside diameter of the bearings 5 and with a suitable strength of the attachment of the blades 2 to this hub. The blades 2 are rigid at their outer ends with a tube 10 which constitutes, from the aerodynamic point of view, the guide channel of the circulation of the air through the fan unit.

The blades 2 have a profile and a setting (orientation with respect to the radial plane of the impeller) which are such that the flow along the blades of the stream of air is laminar and the streams of air only become detached from the blades at the trailing edge of the latter. In this way, there is achieved an excellent permeability of the fan, which may be 60%. A description of a suitable profile of the blades may be found in a report of the National Advisory Comittee of Aeronautics (NACA), which is an official body in the U.S.A. which published a report on this subject in 1945.

The tube 10 is made from a ferromagnetic material which is a good conductor of the magnetic flux. It may therefore be made for example, from soft iron, a rolled soft iron sheet, agglomerated ferromagnetic powder etc .... It moreover mechanically maintains the ends of the blades 2, the construction of which may therefore be lighter than in the case of an impeller carrying blades whose outer ends are free, as in the case of the prior art.

Fixed to the outer peripheral surface 11 of the tube or channel 10 are a plurality of permanent magnets 12. As the presently described embodiment concerns a four-pole electric driving motor, the fan unit shown in FIGS. 1 to 3 has four permanent magnets 12. However, it will be understood that the invention is not intended to be limited to this number.

The permanent magnets 12 are alternately oriented N-S, S-N, N-S, etc ... so that the tube 10 contributes to the closure of the field of the magnets on the side adjacent to the shaft 4.

The permanent magnets 12 may be formed by any known material for this purpose, the choice of which depends solely on the desired induction or field. There may be for example chosen special magnetic alloys, plastoferrites, agglomerated ferrites, a samarium-cobalt alloy, etc .... The tube 10 and the permanent magnets 12 constitute the rotor of an electric driving motor, the assembly being rotatably mounted on the shaft 4 through the blades 2.

The sleeve 8 has an octogonal shape, the sides of which are alternately fixed to respective arms 7. The sides of this sleeve corresponding to the arm 7 each carry a pole shoe 13 which is disposed in such manner with respect to the outer perimeter of the magnets 12 that there is an airgap e. The pole shoes 13 are made from a ferromagnetic material which may be one of the materials already mentioned hereinbefore. With this construction, the sleeve 8 and the pole shoes 13 may close the magnetic circuit of the motor by conducting the magnetic flux generated by the permanent magnets 12. This assembly therefore constitutes the stator of the electric motor of the fan unit. It will be understood that any other arrangement of the magnetic part of the stator may be provided.

Each pole shoe 13 carries a coil or winding 14 for producing the induction required for the operation of the motor. The field thus produced creates a magnetic field in the airgap e and results, by the combined action of the magnets 12 and the magnetic conduction of the tube 10, in mechanical forces which depend on the directions of the fields produced by the windings 14 and on the directions of the field of the magnets in the vicinity of the pole shoes 13.

The assembly just described thus constitutes an autosynchronous step-by-step motor.

The electric motor is supplied with power by an electronic circuit schematically shown in FIG. 6 to which reference will now be made.

The coils 14 are connected in parallel and associated with control transistors 15 which are of the NPN type. The collector-emitter circuits of the transistors 15 form the branches of a bridge whose diagonal is connected to a supply and whose other diagonal is connected to the coils 14 in parallel. The bases of these transistors are connected to two amplifiers 16, it being understood that each amplifier supplies current to two transistors connected respectively in opposed branches of the bridge of transistors.

Figure 7:
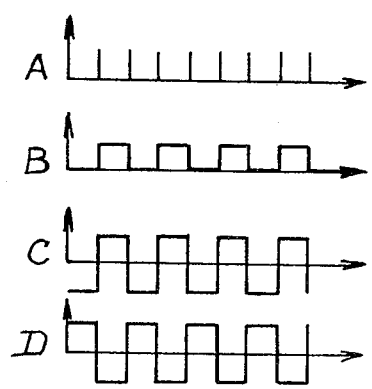
FIG. 7 is a graph showing the waveforms at the various points of the diagram of FIG. 6.

The output signals of the amplifiers 16 are generated by a detector 17 which is adapted to deliver a signal representing the angular position of the rotor 10, 12 of the electric motor with respect to the stator 8, 13, 14 thereof. This detector may be a magneto-resistance sensor, a Hall detector, an induction coil, an opto-electric or like system. The signal delivered by the detector 17 (shown at A in FIG. 7) is applied to a frequency divider 18 in which it is shaped, its frequency being divided by two. The signal shown at B in FIG. 7 results. The output of the frequency divider 18 is applied to a phase shifting circuit 19 which is adapted to start up the motor and also, optionally, permit a variation in the speed of the assembly as a function of an exterior parameter which, in the application to an internal combustion engine, may be the temperature of the cooling fluid circulating in the cooling circuit of this engine. The exterior parameter may be applied through a detection circuit 20 connected to the phase shifting circuit 19.

The output signal of the phase shifting circuit 19 is then directly applied to one of the amplifiers 16 while the other amplifier receives the same signal through a circuit 21 which shifts the phase 180°. Thus, it is possible to send to two opposed pairs of coils currents whose variation is that shown respectively by the curves C and D of FIG. 7. It can be seen that these currents are in phase opposition. Thus, when the coils 14 are supplied with these currents, the fan unit will rotate at a speed which is regulated by itself as a function of, on one hand, mechanical magnetic and electrical losses and, on the other hand, the resisting torque due to the rotation of the impeller 1.

In order to obtain a satisfactory efficiency of the motor, the detector 17 must be so angularly set that it is exactly halfway between two successive pole shoes 13.

The phase shifter 19 modifies with respect to time the instant when the signal delivered by the detector 17 is applied to the circuit.

Starting up in a given direction, ie. that in which the impeller 1 operates, is achieved by construction by slightly offsetting one of the pole shoes 13 with respect to the other. It is also possible to create an asymetry in respect of the value of the airgap e in front of the pole shoes 13.

Figure 4:
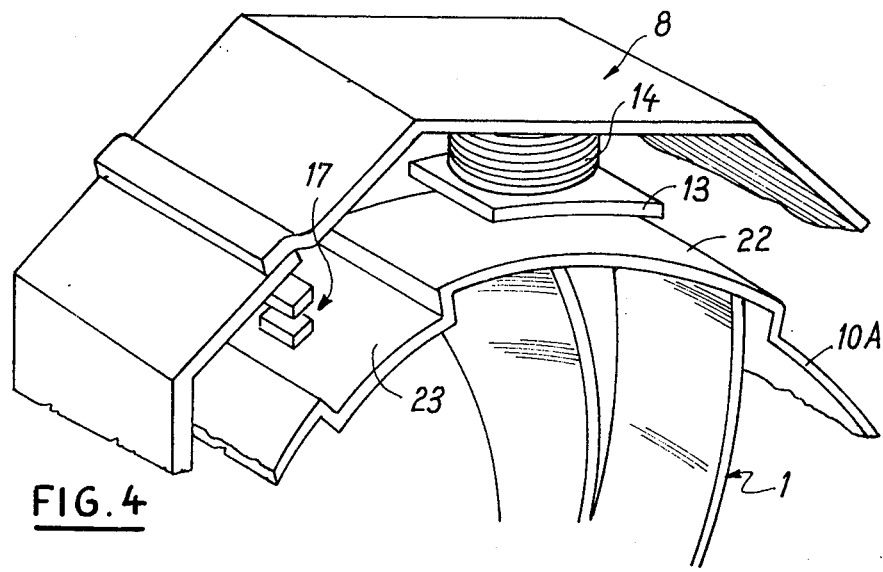
FIG. 4 is a view similar to FIG. 3, but showing another embodiment of the invention.

FIG. 4 shows a modification of the fan unit in which a channel 10A is provided which is "corrugated" instead of being cylindrical as in the embodiment of FIGS. 1 to 3, so that its outer profile has portions or lands 22 which are radially salient with respect to portions or lands 23, the portions 22 then performing the function of the permanent magnets of the preceding embodiments. Consequently, this motor has an airgap which varies along its periphery and thus constitutes a reluctance step-by-step motor.

Those skilled in the art will understand that other modifications may be made in the construction of the electric part of the motor integrated in the fan unit as described hereinbefore.

The shaft 4 may be fixed in a support as described before, but it is also possible to render it directly rigid with a part of the body of the vehicle, for example the front grill or the front side, having a plurality of functions of modern vehicles.

The channel 10 or 10A may be attached to the impeller blades or be in one piece with the latter. Likewise, the pole shoes 13 may be attached to the sleeve 8 or formed in one piece with the latter. The coils 14 may be advantageously formed by anodized aluminium strips.

The sleeve 8 may be made from a single piece or comprise separate elements, as shown in the Figures.

Figure 8:
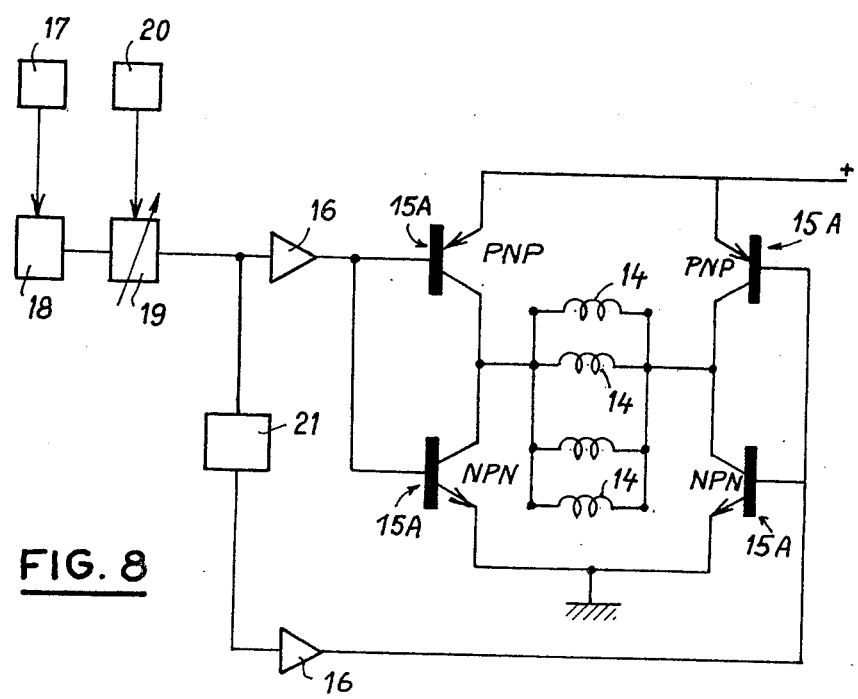
FIG. 8 is a second very simplified diagram of an electric control circuit.

FIG. 8 shows another possible electric circuit diagram for supplying current to the coils 14. This diagram differs from the diagram of FIG. 6 only in respect of the transistors 15A which are here of the PNP or NPN type as shown. In this case, the bases of the transistors are connected to the amplifiers 16, each of which is connected to two complementary transistors on the same side of the transistor bridge.

Figure 6:
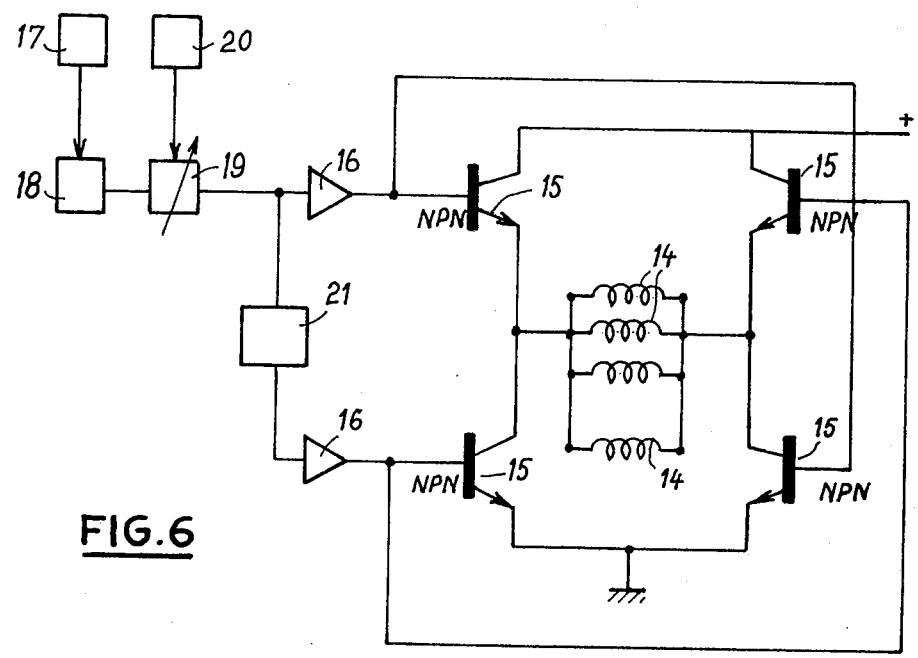
FIG. 6 is a first very simplified diagram of a circuit electrically controlling the fan unit according to the invention.

The electric circuits shown in FIGS. 6 and 8 merely constitute examples and other circuits may be provided employing for example bipolar transistors or power transistors employing MOS. The circuit on the whole may be formed on an integrated circuit.

FIG. 5 shows a modification of the fan unit according to the invention in which the stator of the electric motor does not completely surround the channel 10 and the impeller 1. In this case, the stator comprises a magnetic circuit element 24 which has only two pole shoes 25 provided with coils, the channel 10 being moreover identical to that of the preceding Figures. As illustrated, this fan unit is mounted in front of the radiator R placed in front of the internal combustion engine (not shown) of the body C of an automobile vehicle. It will be understood that other arrangements could be envisaged within the scope of the invention.

It can be seen from the foregoing description that the invention affords several advantages.

The overall axial length of the fan unit remains reduced to a minimum and, in the case where the shaft 4 is directly fixed in a support, such as the body of the vehicle, it may be limited to solely the axial length of the impeller.

The aerodynamic efficiency of the operation of the fan is distinctly improved over conventional arrangements since, on one hand, the profile of the blades creates no turbulence and, on the other hand, the channel 10 or 10A is directly connected to the blades and there is therefore practically no other disturbance by the centrifugation of the air flowing through the fan unit.

The permeability of the assembly is considerable, on one hand, due to the very small diameter of the hub 3 of the impeller 1, and, on the other hand, due to the fact that the blades have an orientation which is substantially axial.

The control of this fan unit is very conveniently achieved owing to the electronic circuit shown in FIG. 6 the control of which may be effected as a function of a parameter such as the temperature.

Having now described my invention what I claim as new and desire to secure by Letters Patent is:

1. A fan unit for cooling an internal combustion engine of an automobile vehicle, said unit comprising a shaft, a fan impeller having a hub of minimum radial size and blades, and rotatable about said shaft in a given plane and an electric driving motor drivingly connected to the impeller, said motor comprising a stator disposed radially outside the impeller relative to said shaft, field coils on the stator and a rotor including an exterior annular body which is made from a ferromagnetic material and is electrically cooperative with the coils of the stator and connected to rotate with said blades, the outer annular body of the rotor being formed by a tubular channel for guiding a flow of air through the unit, said channel having an outer periphery and including on said outer periphery permanent magnets which are cooperative with said stator, said channel and said magnets being substantially sheet-like elements extending in directions parallel to said shaft and circumferentially of said shaft and having no flange in planes perpendicular to said shaft so as to offer minimum resistance to said flow of air, said electric motor being of a DC autosynchronous type supplied with power by an electronic circuit which is connected thereto and generates periodic signals.

2. A fan unit for cooling an internal combustion engine of an automobile vehicle, said unit comprising a fan impeller having blades and an electric driving motor drivingly connected to the impeller, said motor comprising an annular stator, field coils on the stator and a rotor including a hub and an exterior annular body which is made from a ferromagnetic material and is electrically cooperative with the coils of the stator and connected to rotate with the hub through the blades of said impeller, the outer annular body of the rotor being formed by a channel for guiding a flow of air through the unit, said channel extending axially and including on the outer periphery thereof permanent magnets which are cooperative with said stator, said electric motor being of a DC autosynchronous type supplied with power by an electronic circuit which is connected thereto and generates periodic signals, said channel having a slightly corrugated profile in cross section, distinct portions of which profile constitute distinct airgaps with said stator.

3. A fan unit for cooling an internal combustion engine of an automobile vehicle, said unit comprising a shaft, a fan impeller having a hub of minimum radial size and blades and rotatable about said shaft in a given plane and an electric driving motor drivingly connected to the impeller, said motor comprising disposed radially outside the impeller relative to said shaft a stator, field coils on the stator and a rotor including an exterior annular body which is made from a ferromagnetic material and is electrically cooperative with the coils of the stator and connected to rotate with said blades, the outer annular body of the rotor being formed by a tubular channel for guiding a flow of air through the unit, said channel having an outer periphery and including on said outer periphery permanent magnets which are cooperative with said stator, said channel and said magnets being substantially sheet-like elements extending in directions parallel to said shaft and circumferentially of said shaft and having no flange in planes perpendicular to said shaft so as to offer minimum resistance to said flow of air, said electric motor being of a DC autosynchronous type supplied with power by an electronic circuit which is connected thereto and generates periodic signals, and said blades being set at a pitch angle equal to at least 45° relative to said given plane so that said blades offer little resistance to said flow of air when said impeller is not driven by said motor.

4. A unit according to claim 1, wherein the permanent magnets are of alternating polarities and are fixed on an outer peripheral surface of the channel.

5. A unit according to claim 3, wherein said field coils define throughway open spaces therebetween circumferentially of said rotor and, in a region of said spaces, said stator is a substantially sheet-like element which extends in directions parallel to said shaft and circumferentially of said shaft so as to offer little resistance to flow of air through the unit.

6. A unit according to claim 5, wherein pole shoes are mounted in circumferentially spaced relation on an inner surface of said stator in confronting relation to said channel, and each pole shoe carries a field coil.

7. A unit according to claim 5, wherein said stator is a sleeve having a plurality of parts of a ferromagnetic material.

8. A unit according to claim 5, wherein said stator is a sleeve in a single part of ferromagnetic material.

9. A unit according to claim 7 or 8, wherein pole shoes are mounted in circumferentially spaced relation on an inner surface of said stator in confronting relation to said channel and each pole shoe carries a field coil.

10. A unit according to any one of the claims 3 to 6, wherein said electronic circuit comprises semi-conductor switches and a position detector for controlling said switches, the coils of the stator being selectively supplied with current through the semi-conductor switches, and said position detector being associated with the stator and the rotor for detecting the relative position of the stator and rotor.

11. A fan unit for cooling an internal combustion engine of an automobile vehicle, said unit comprising a fan impeller having blades and an electric driving motor drivingly connected to the impeller, said motor comprising an annular stator, field coils on the stator and a rotor including a hub and an exterior annular body which is made from a ferromagnetic material and is electrically cooperative with the coils of the stator and connected to rotate with the hub through the blades of said impeller, the outer annular body of the rotor being formed by a channel for guiding a flow of air through the unit, said channel extending axially and including on the outer periphery thereof permanent magnets which are cooperative with said stator, said electric motor being of a DC autosynchronous type supplied with power by an electronic circuit which is connected thereto and generates periodic signals, said electronic circuit comprising semi-conductor switches and a position detector for controlling said switches, the coils of the stator being selectively supplied with current through the semi-conductor switches, and said position detector being associated with the stator and the rotor for detecting the relative position of the stator and rotor, a phase-shifting circuit coupling said detector to said semi-conductor switches, and the degree of phase shift of which phase-shifting circuit being controllable as a function of a regulation parameter.

12. A unit according to claim 10, wherein said parameter is the temperature.

* * * * *